United States Patent
Olm et al.

(10) Patent No.: US 8,753,155 B2
(45) Date of Patent: Jun. 17, 2014

(54) WHEEL WITH FOLDING SEGMENTS

(71) Applicant: Draganfly Holdings, Inc., Saskatoon (CA)

(72) Inventors: Orville Olm, Saskatoon (CA); Zenon Dragan, Saskatoon (CA); Greg Wood, Saskatoon (CA)

(73) Assignee: Draganfly Innovations Inc., Saskatoon Saskatchewan (CA)

( * ) Notice: Subject to any disclaimer, the term of this patent is extended or adjusted under 35 U.S.C. 154(b) by 0 days.

(21) Appl. No.: 13/739,419

(22) Filed: Jan. 11, 2013

(65) Prior Publication Data

US 2014/0057505 A1  Feb. 27, 2014

(30) Foreign Application Priority Data

Aug. 22, 2012  (CA) ...................................... 2787075

(51) Int. Cl.
*B63H 19/08*  (2006.01)
*B62D 57/024*  (2006.01)
*B62B 5/02*  (2006.01)

(52) U.S. Cl.
USPC ........................... 440/12.66; 180/8.2; 280/5.2

(58) Field of Classification Search
USPC .......... 280/5.2, 5.26, 5.28, 5.32; 180/8.1, 8.2, 180/8.3, 8.7; 305/1–6; 440/12.66
See application file for complete search history.

(56) References Cited

U.S. PATENT DOCUMENTS

| 3,179,431 | A |   | 4/1965  | Pikl |
|---|---|---|---|---|
| 3,499,501 | A | * | 3/1970  | Bauer et al. ................. 180/8.2 |
| 3,688,731 | A |   | 9/1972  | Houle |
| 4,421,189 | A |   | 12/1983 | Watkin et al. |
| 4,664,051 | A |   | 5/1987  | Newkirk |
| 4,919,489 | A |   | 4/1990  | Kopsco |
| 5,058,643 | A |   | 10/1991 | Nakasaki |
| 6,422,576 | B1 |  | 7/2002  | Michaeli |
| 7,363,994 | B1 |  | 4/2008  | DeFazios |
| 7,445,530 | B2 |  | 11/2008 | Munshaur et al. |
| 7,543,663 | B2 | * | 6/2009 | Setrakian et al. .............. 180/8.1 |
| 7,942,710 | B2 |  | 5/2011  | Gaither |
| 2011/0127732 | A1 | | 6/2011 | Mann et al. |

* cited by examiner

*Primary Examiner* — S. Joseph Morano
*Assistant Examiner* — Andrew Polay
(74) *Attorney, Agent, or Firm* — Nixon & Vanderhye P.C.

(57) ABSTRACT

A circular folding wheel has a center wheel section encompassing the center of a circle and adapted to be mounted to an axle at the center, with a side substantially corresponding to a chord of the circle. A wheel segment is pivotally attached to the center wheel section about a pivot axis extending along the side of the center wheel section. The wheel segment is movable from a rolling orientation, where the outer edge of the wheel segment is aligned with an outer edge of the center wheel section such that the folding wheel takes a rolling circular shape, to a folded orientation where the wheel segment extends laterally away from the pivot axis. Two, three, or more wheel segments can be pivotally attached to corresponding sides of the center wheel section.

20 Claims, 4 Drawing Sheets

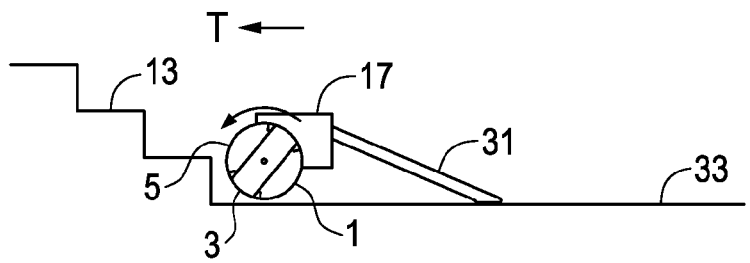
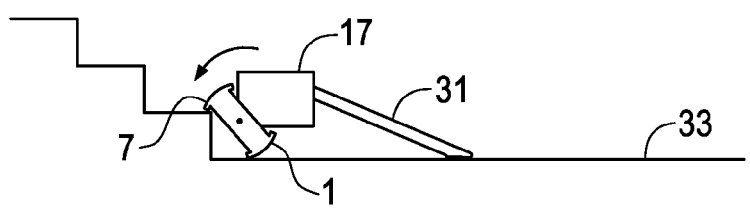
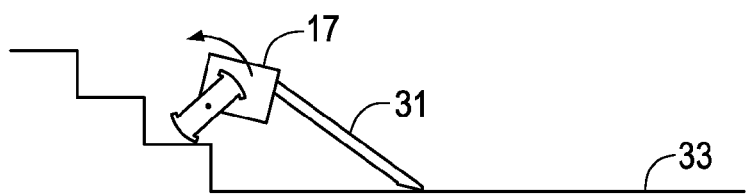
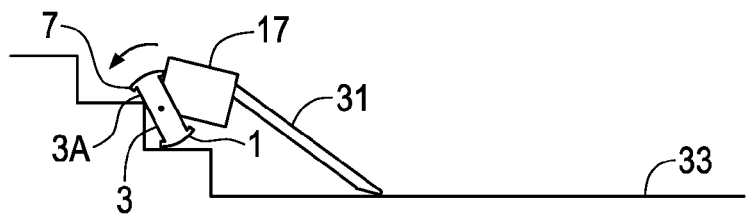
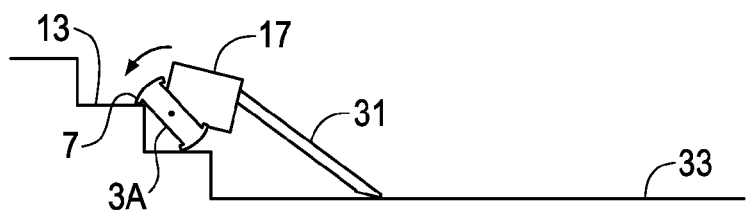
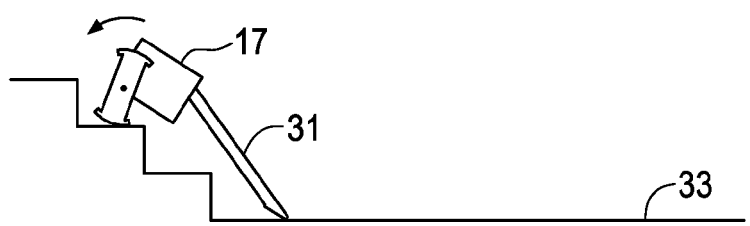

WHEEL WITH FOLDING SEGMENTS

This application claims priority to CA Application No. 2,787,075, filed 22 Aug. 2012, the entire contents of which is hereby incorporated by reference.

This invention is in the field of wheels and in particular a wheel apparatus with folding segments to facilitate climbing over obstacles, and to act as a paddle for amphibious vehicles.

BACKGROUND

A well-known problem for vehicles such as robots, wheelchairs, hand trucks, and the like, is to provide some mechanism to overcome obstacles, such as stairs, curbs, and the like, that will be in the path of the vehicle.

United States Application Patent Number 2011/0127732 of Mann et al. provides a wheel with a circular perimeter for smooth rolling on travel surface, and movable protrusions that are withdrawn into the wheel for regular travel, and that can be extended radially outward from the perimeter to engage and climb stairs.

U.S. Pat. No. 4,421,189 to Watkins et al. provides a spoked wheel with a small wheel rotatably mounted on the outer end of each spoke. On a level surface the spoked wheel is stationary, and the vehicle rolls on the small wheels. When a stair is encountered, the spoked wheel turns and the small wheels engage the top of each step in turn as the spokes turn, pulling the wheel and vehicle up the stairs.

U.S. Pat. No. 7,363,994 to DeFazio provides a plurality of wheels on each side of a wheeled platform where the perimeter of the wheels overlap. Small spokes extend from the perimeter of each wheel and engage stairs to climb same.

U.S. Pat. No. 4,919,489 to Kopsco discloses a wheel having an elastomeric flexible outer annulus upon which the wheel normally rides. Parallel spaced sprockets receive the annulus and include individual cogs which extend less radially outwardly than the annulus. When an obstacle is encountered, the flexible annulus yields, thereby enabling a protruding cog to engage the obstacle and pivot around it thereby lifting the vehicle over the obstacle.

U.S. Pat. No. 6,422,576 to Michaeli and U.S. Pat. No. 3,179,431 to Pikl similarly disclose wheels where the outer perimeter flexes radially inward when encountering a stair edge, thereby forming a protrusion to engage the step and move the wheel upward.

Amphibious vehicles require a propulsion mechanism operative both on land and water. U.S. Pat. No. 7,942,710 to Gaither discloses an amphibious all-terrain vehicle that has separate hydraulic wheel and propeller drives, however it is also well known to use only a wheel drive. The wheels themselves can have treads or pockets on the outer perimeter to engage the water for propulsion, for example as disclosed in U.S. Pat. No. 7,445,530 to Munshaur et al., U.S. Pat. No. 4,664,051 to Newkirk, and U.S. Pat. No. 5,058,643 to Nakasaki. U.S. Pat. No. 3,688,731 to Houle discloses a system where an impeller wheel is mounted on a driven axle and is configured to be above the ground when on land, and to engage the water when the vehicle is floating.

SUMMARY OF THE INVENTION

It is an object of the present invention to provide a wheel apparatus that overcomes problems in the prior art.

The present invention provides in a first embodiment a folding wheel having a rolling shape substantially corresponding to a circle with a wheel diameter and a center. The folding wheel comprises a center wheel section encompassing the center and adapted to be mounted to an axle at the center, and having a first side substantially corresponding to a first chord of the circle and a second side opposite the first side and substantially corresponding to a second chord of the circle. A first wheel segment is pivotally attached to the center wheel section about a first pivot axis extending along the first side of the center wheel section, and a second wheel segment is pivotally attached to the center wheel section about a second pivot axis extending along the second side of the center wheel section. The first and second wheel segments are movable from a rolling orientation, where outer edges of the first and second wheel segments are aligned with an outer edge of the center wheel section such that the folding wheel takes the rolling shape, to a folded orientation where the first and second wheel segments extend laterally away from the respective first and second pivot axes.

The present invention provides in a second embodiment a folding wheel having a rolling shape substantially corresponding to a circle with a wheel diameter and a center. The folding wheel comprises a center wheel section encompassing the center and adapted to be mounted to an axle at the center, and having a side substantially corresponding to a chord of the circle, and a wheel segment pivotally attached to the center wheel section about a pivot axis extending along the side of the center wheel section. The wheel segment is movable from a rolling orientation, where an outer edge of the wheel segment is aligned with an outer edge of the center wheel section such that the folding wheel takes the rolling shape, to a folded orientation where the wheel segment extends laterally away from the pivot axis The folding wheel of the present invention can be used on various vehicles such as remote controlled robots, hand trucks, wheel chairs, and the like to allow the vehicle to climb stairs or like obstacles, or to provide a stable stationary position for the vehicle. The folding wheel can also act as a paddle wheel to effectively propel an amphibious vehicle along a water surface. The folding wheel is simple and economical, and can be scaled up or down as required to suit a particular application.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIGS. 9A to 9F schematically illustrate the robot apparatus of FIG. 7 climbing a set of stair steps;

DETAILED DESCRIPTION OF THE ILLUSTRATED EMBODIMENTS

Figure 1:
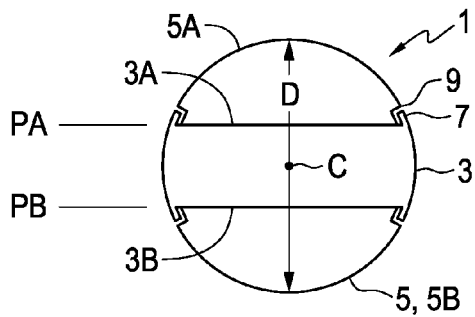
FIG. 1 is a schematic side view of an embodiment of a folded wheel of the present invention in the rolling orientation.

FIGS. 1-6 schematically illustrate an embodiment of a folding wheel 1 of the present invention. The folding wheel 1 has a rolling shape as illustrated in FIG. 1 that corresponds as illustrated to a circle with a wheel diameter D and a center C.

The folding wheel 1 comprises a center wheel section 3 encompassing the center C and adapted to be mounted to an axle at the center C, and having a first side 3A substantially corresponding to a first chord of the circle and a second side 3B opposite the first side 3A and substantially corresponding to a second chord of the circle.

A first wheel segment 5A is pivotally attached to the center wheel section 3 about a first pivot axis PA extending along the first side 3A of the center wheel section 3, and a second wheel segment 5B pivotally attached to the center wheel section 3 about a second pivot axis PB extending along the second side 3B of the center wheel section 3.

Figure 2:
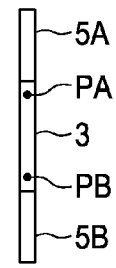
FIG. 2 is a schematic rear view of the embodiment of FIG. 1.
Figure 3:
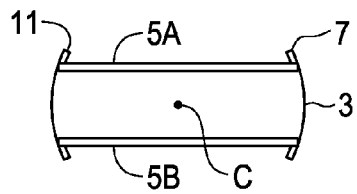
FIG. 3 is a schematic side view of the embodiment of FIG. 1 in the folded orientation, with wheel segments thereof extending laterally in the same direction from the center wheel section.
Figure 4:
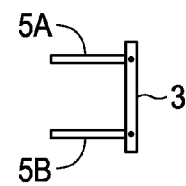
FIG. 4 is a schematic rear view of the embodiment of FIG. 1 in the folded orientation of FIG. 3.

The first and second wheel segments 5A, 5B are movable from a rolling orientation shown in FIGS. 1 and 2, where outer edges of the wheel segments 5 are aligned with the outer edge of the center wheel section 3 such that the folding wheel 1 takes the rolling shape, to a folded orientation shown in where the wheel segments 5A, 5B extend laterally away from the respective first and second pivot axes PA, PB. FIGS. 3 and 4 show one configuration of the folded orientation where the first and second wheel segments 5A, 5B extend laterally away from the respective first and second pivot axes PA, PB in the same direction, while FIGS. 3 and 4 show another configuration of the folded orientation where the first and second wheel segments 5A, 5B extend laterally away from the respective first and second pivot axes PA, PB in opposite directions.

Figure 5:
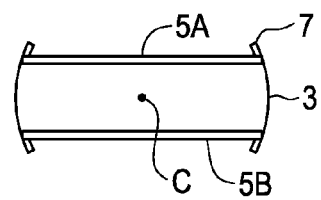
FIG. 5 is a schematic side view of the embodiment of FIG. 1 in the folded orientation, with wheel segments thereof extending laterally in opposite directions from the center wheel section.
Figure 6:
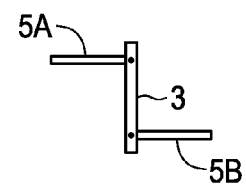
FIG. 6 is a schematic rear view of the embodiment of FIG. 1 in the folded orientation of FIG. 5.

It is contemplated that for most uses the configuration of FIGS. 3 and 4 will be used, however for some applications the configuration of FIGS. 5 and 6 may be preferred, such as where the folding wheel 1 acts as a paddle wheel for an amphibious vehicle and the configuration of FIGS. 5 and 6 may provide an increased area for engaging the water. It is also contemplated that a vehicle could be made where both configurations of the folded orientation are possible.

The first and second chords, substantially corresponding to the first and second sides 3A, 3B of the center wheel section 3, are substantially parallel and substantially the same length. When the wheel is in the rolling orientation the orientation of the chords is essentially immaterial, but in the folded orientation this symmetric configuration will provide the same lateral extending surface on both sides of the folding wheel 1 equidistant from the wheel center C, and it is contemplated that for most applications will be preferred.

It is contemplated that the folding wheel 1 could be used in a variety of applications. For example it may be desired have the wheel fold to convert the wheel from a rolling object to a non-rolling object, such as to provide a stable stationary position for a vehicle. In many applications it will be desired to use the wheel 1 to climb over obstructions, or up a set of stairs.

To facilitate the climbing ability of the folded wheel 1, the illustrated wheel 1 provides a gripping lug 7 extending from each end of each side 3A, 3B of the center wheel section 3 when the first and second wheel segments 5 are in the folded orientation. When the wheel 1 is in the rolling orientation, the lugs 7 enter recesses 9 in the first and second wheel segments 5 such that the outer perimeter of the wheel 1 is substantially circular.

The outer ends 11 of the gripping lugs 7 will typically comprise a high friction material, such as rubber or the like. As illustrated in FIGS. 7A-7F, when climbing a set of stair steps 13 the high friction material grips the top surface 15 of the stair and holds the gripping lug 7 so that as the wheel 1 turns, the lug 7 stays substantially stationary with respect to the stair step and so the wheel 1 climbs the stair steps 13. Similar obstructions are overcome in a like manner. It is contemplated that one or more sharp spikes may be used instead of a high friction material on the outer ends 11 of the gripping lugs 7, or some other means to resist movement of the center wheel section 3 when climbing obstacles.

Figure 7:
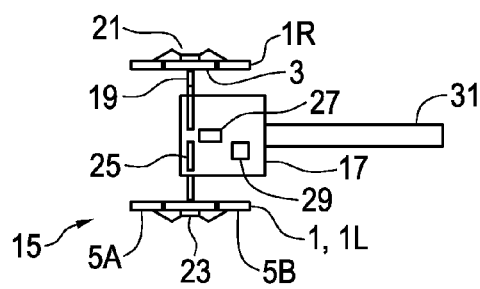
FIG. 7 is a schematic top view of a two-wheeled robot apparatus with right and left folding wheels as in the embodiment of FIG. 1; and schematically illustrating a control mechanism operative to move the wheel between the folded and rolling orientations.

FIGS. 7A-7F show the folding wheel 1 mounted on a robot apparatus 15 as schematically illustrated in FIG. 7. The robot apparatus 15 has a robot body 17, and an axle 19 mounted to the robot body. Center wheel sections 3 of right and left folding wheels 1R, 1L are attached to corresponding right and left outer ends of the axle 19.

Figure 8:
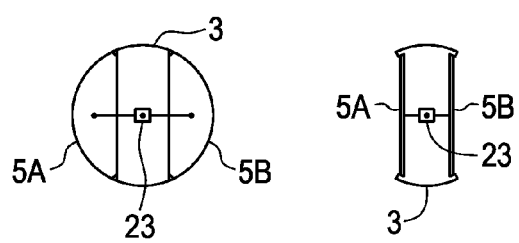
FIGS. 8 and 8A show side views of one of the wheels and the control mechanism of the robot apparatus of FIG. 7 with the wheel in the rolling orientation and the folded orientation respectively.
Figure 8A:
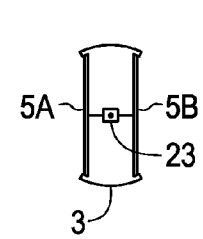

The folding wheel can be moved between the rolling and folded orientations manually by operating latches or the like to lock the wheel segments 5 in one orientation or the other. Typically however a control mechanism 21 is provided to move the first and second wheel segments 5 of the right and left folding wheels 1R, 1L between the rolling orientation shown in FIG. 8 and the folded orientation shown in FIG. 8A. It is contemplated that various control mechanisms could provide the required function, and in the illustrated robot apparatus 15 the control mechanism 21 comprises a linkage 23 mounted to each center wheel section 3. The linkage 23 is connected to the first and second wheel segments 5A, 5B of the folding wheels 1, and a push member 25 connected at an outer end thereof to the linkage 23 and extending through the axle 19. The inner end of the push member 25 is connected to an actuator 27 operative to move the push member 25 in and out along the axle 19 to move the first and second wheel segments 5A, 5B from the rolling orientation shown in FIG. 8 to the folded orientation shown in FIG. 8A.

A drive system 29 is operative to rotate the right and left folding wheels 1R, 1L independently such that the rotational speeds thereof can be increased or decreased on each side independently to provide steering control.

The illustrated robot apparatus 15 is a two-wheeled apparatus and stability is provided by a tail section 31 attached to the robot body 17 and configured to rest on a surface 33 behind the robot body 17 when the robot apparatus 15 travels along the surface 33 in a forward operating travel direction T, substantially as schematically illustrated in FIG. 9A.

The robot apparatus in FIG. 9A is shown approaching a set of stair steps 13. At this point the folding wheels are moved from the rolling to the folded orientation and as the folded wheel 1 rotates the gripping lug 7 bears against the top surface of the stair step 13 as seen in FIG. 9B and as the wheel 1 rotates the robot body 17 is lifted as seen in FIG. 9C.

As the wheel 1 continues rotating, the flat side 3A of the center wheel section 3 contacts the edge of the next step 13 and typically the wheel 1 will simply spin with the flat side 3A of the center wheel section 3 sliding along the edge of the step until the gripping lug 7 contacts the top surface of the step 13 as shown in FIG. 9E and resists further spinning of the wheel 1, and as the wheel 1 turns further the robot body 17 is lifted further, as seen in FIG. 9F. In this manner the robot apparatus 15 is pulled up the steps 13 by the folded wheel 1, with the tail section 31 dragging along up the steps 13. When the top of the set of steps 13 is reached, the wheel segments 5 can be returned to the rolling orientation for travel along the floor of the next level. A robot apparatus with 4 wheels, or more would climb stairs in substantially the same manner.

Figure 10A:
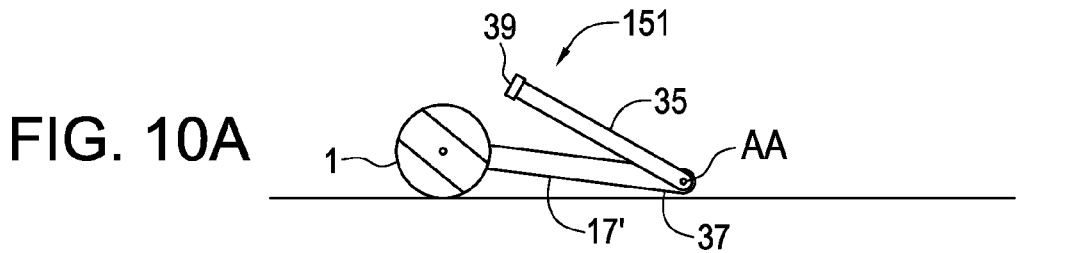
FIG. 10A schematically illustrates a two wheeled robot similar to the robot apparatus of FIG. 7 with an extendable arm attached to a rear end of the tail section, and with wheels in the rolling orientation.

FIGS. 10A-10E schematically illustrate the wheel folding to convert the wheel 1 from a rolling object to a non-rolling object so as to provide a stable stationary position for a robot apparatus 15'. As seen in FIG. 10A, the body 17' of the robot apparatus 15' trails behind the wheels 1 and also functions as the tail section 31 described with respect to the robot apparatus 15 described above. An extendable arm 35 is attached at a lower end thereof to a rear portion of the robot body 17' about an arm axis AA, and an arm drive 37 is operative to rotate the extendable arm 35 about the arm axis AA.

Figure 10B:
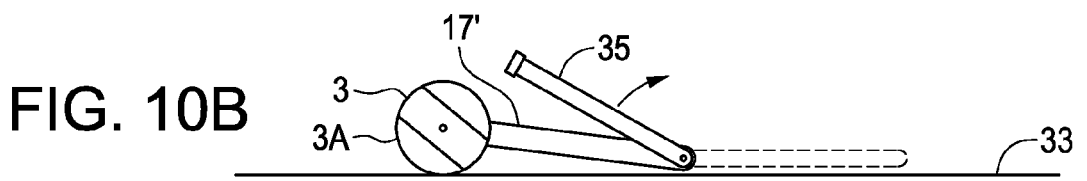
FIG. 10B schematically illustrates the robot of FIG. 10A with the wheels in the folded orientation, and the extendable arm rotated rearward to push against the ground behind the tail section.

FIG. 10B shows the wheels 1 in the folded orientation, and oriented at an angle to the surface 33. The illustrated orientation shows that the wheels 1 can be at virtually any position when the robot apparatus 15' is stopped, so that visual contact of the operator with the robot is not required. Once the wheels 1 are in the folded orientation, the extendable arm 35 is rotated about the arm axis AA as shown to bear against the surface 33.

Figure 10C:
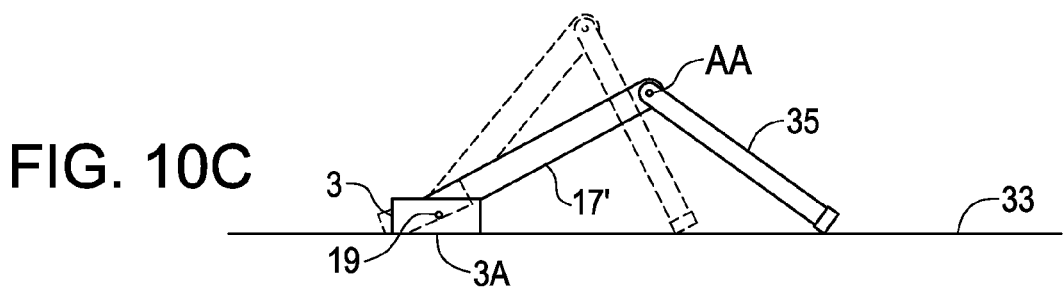
FIG. 10C schematically illustrates the extendable arm rotated further down such that the flat side of the folded wheel is on the travel surface.
Figure 10D:
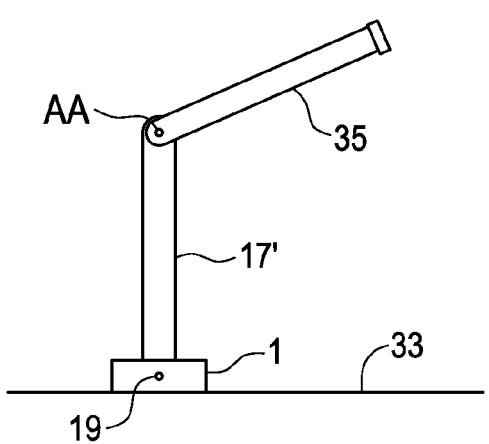
FIG. 10D schematically illustrates the robot body rotated to the upright substantially vertical position.

FIG. 10C shows the extendable arm 35 rotated further, pushing the rear end of the body 17' upward until the flat side 3A of the center wheel section 3 of the folding wheel 1 is flat on the surface 33. The extendable arm 35 can be rotated further to move the arm 35 and body 17' closer to the wheel as illustrated by the dotted lines to reduce the moment about the flat side of the wheel such that the apparatus will not tip over when the end of the arm that is bearing against the surface 33 is raised. The center wheel sections 3 can tip up on edge during this process. The wheel drive can then be activated, the center wheel sections 3 will tip back down on their flat sides 3A, and then since the wheels 1 are then resting on their flat sides, instead of the wheels rotating further, the body 17' rotates about the axle 19 while the wheels 1 remain stationary, and the body 17' moves to the upright position of FIG. 10D with the arm 35 above the surface 33. The robot apparatus 15' is configured with wheel sizes and body and arm weights so that the extendable arm 35 is supported while extending laterally as shown in FIG. 10D.

Figure 10E:
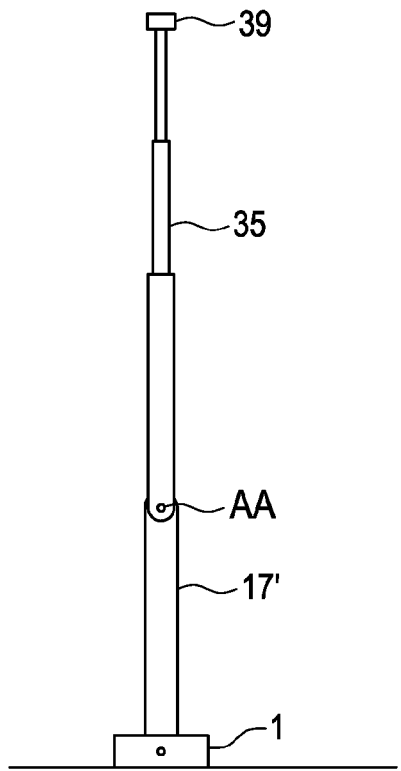
FIG. 10E schematically illustrates the arm extended to provide a high unobstructed view for a camera mounted thereon.

The arm drive 37 is then activated to rotate the extendable arm 35 about the arm axis AA to the substantially vertical position of FIG. 10E, where same can be extended as illustrated.

The robot apparatus 15' can thus be used for example for remote surveillance. A camera 39 mounted on the end of the extendable arm 35 can be used by a remote operator to view the path of the apparatus 15' and operate the control mechanism to steer the robot and move the wheels between the rolling and folded orientations as required. A common problem in remote surveillance is that the camera carried by the robot is located too low to the floor to give a good view. The illustrated robot apparatus 15' can be used as described to raise the camera 39 to an elevated location to look over obstructions and improve the camera view.

Figure 11A:
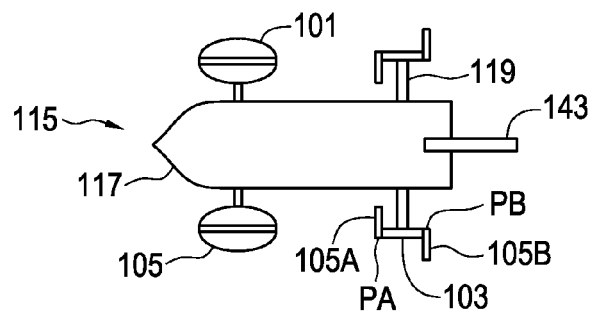
FIGS. 11A to 11C schematically show top, right side, and rear views respectively of an amphibious four wheeled robot apparatus floating on a body of water.
Figure 11B:
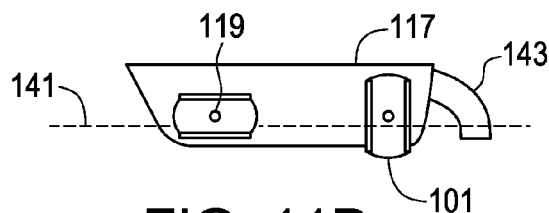
Figure 11C:
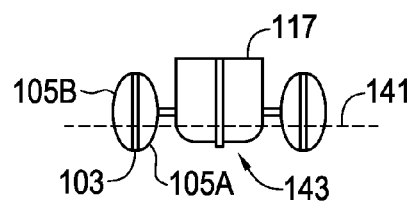

FIGS. 11A-11C schematically illustrate an amphibious four wheeled robot apparatus 115 wherein the robot body 117 is configured to float on a body of water 141. In the illustrated folded orientation of the wheels 101, the wheel segments 105 engage the water 41 and act as paddle wheels to propel the apparatus 115 along the water. Although the wheel segments 105 could extend laterally away from the center wheel section 103 in the same direction, as illustrated in FIG. 4, in the illustrated apparatus 115, the first and second wheel segments 105A, 105B of the folding wheels 101 extend laterally away from the respective first and second pivot axes PA and PB in opposite directions as illustrated in FIG. 6. The wheel segments 105 thus engage the water 141 on each side of the center wheel section 103, as it is contemplated that such a configuration will provide a larger area of engagement with the water, and an increased driving force compared to engaging the water on the same side. Amphibious robot apparatuses with only two and three wheels, or any greater number are contemplated as well.

The axle 119 is above the surface of the water 141 when the robot body 117 is floating, such that the wheel segments 105 engage the water 141 only on the lower portions thereof moving in the correct direction. A conventional steering axle can be used to turn the front or rear wheels to provide steering control. The wheels 101 on each side can also be driven independently and the rotational speed thereof increased or decreased on each side independently to provide steering control. A rudder 143 could also be provided if desired to provide increased steering control if desired.

Figure 12A:
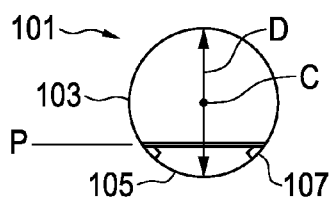
FIG. 12A is a schematic side view of an alternate embodiment of a folded wheel of the present invention with a single wheel segment, shown in the rolling orientation.
Figure 12B:
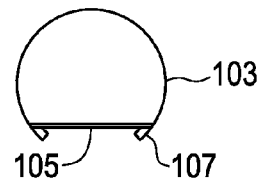
FIG. 12B is a schematic side view of the embodiment of FIG. 12A shown in the folded orientation.
Figure 12C:
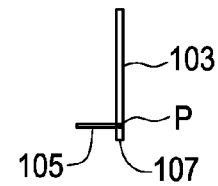
FIG. 12C is a schematic rear view of the embodiment of FIG. 12A shown in the folded orientation.

FIGS. 12A-12C schematically illustrate an alternate embodiment of a folding wheel 101 of the present invention with a single folding wheel segment 105. The folding wheel 101 has a rolling shape as illustrated in FIG. 12A that corresponds as illustrated to a circle with a wheel diameter D and a center C.

The folding wheel 101 comprises a center wheel section 103 encompassing the center C and adapted to be mounted to an axle at the center C, and having a side 103A substantially corresponding to a chord of the circle. A single wheel segment 105 is pivotally attached to the center wheel section about a pivot axis P extending along the side 103A of the center wheel section 103, and the wheel segment 105 is movable from a rolling orientation as schematically illustrated in FIG. 12A, where an outer edge of the wheel segment 105 is aligned with an outer edge of the center wheel section 103 such that the folding wheel 101 takes the rolling shape, to a folded orientation as schematically illustrated in FIGS. 12B, 12C where the wheel segment 105 extends laterally away from the pivot axis P.

The folding wheel 101 can also include a gripping lug 107 extending from an end of the side 103A of the center wheel section 103 when the wheel segment 105 is in the folded orientation. The wheel 101 also has some ability to climb obstructions, and can readily provide a stable stationary position, such as for the robot apparatus 15' schematically illustrated in FIGS. 10A-10E.

Figure 13A:
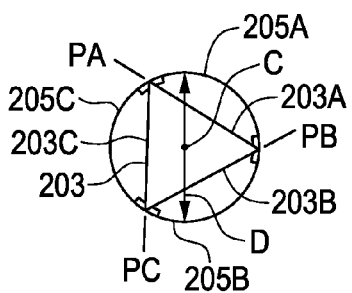
FIG. 13A is a schematic side view of another alternate embodiment of a folded wheel of the present invention with three wheel segments, shown in the rolling orientation.
Figure 13B:
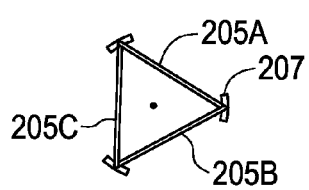
FIG. 13B is a schematic side view of the embodiment of FIG. 13A shown in the folded orientation.
Figure 13C:
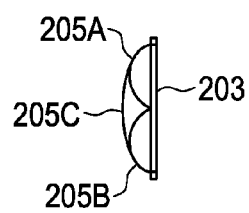
FIG. 13C is a schematic rear view of the embodiment of FIG. 13A shown in the folded orientation.

FIGS. 13A-13C schematically illustrate another alternate embodiment of a folding wheel 201 of the present invention with three folding wheel segments 205A, 205B, 205C. The folding wheel 201 has a rolling shape as illustrated in FIG. 13A that corresponds as illustrated to a circle with a wheel diameter D and a center C.

The center wheel section 203 has a first side 203A that substantially corresponds to a first chord of the circle, a second side 203B that substantially corresponds to a second chord of the circle, and a third side 203C that substantially corresponds to a third chord of the circle. Corresponding first, second, and third wheel segments 205A, 205B, 205C are pivotally attached to the center wheel section 203 about respective first, second, and third pivot axes PA, PB, PC extending along the corresponding first, second, and third sides 203A, 203B, 203C of the center wheel section 203. As described above, the wheel segments 205A, 205B, 205C are movable from the rolling orientation schematically illustrated in FIG. 13A, where outer edges of the wheel segments 205A, 205B, 205C are aligned with the outer edge of the center wheel section 203 such that the folding wheel 201 takes the rolling shape, to the folded orientation schematically illustrated in FIGS. 13B, 13C where the wheel segments 205A, 205B, 205C extend laterally away from the corresponding pivot axes PA, PB, PC.

The folding wheel 201 can also include a gripping lug 207 extending from an end of the sides 203A, 203B, 203C of the center wheel section 203 when the wheel segments 205A, 205B, 205C are in the folded orientation. The wheel 201 also has climbing ability and can readily provide a stable stationary position.

It is contemplated that the number and orientation of the wheel segments can be selected to suit various other applications.

The folding wheel 1 of the present invention thus provides a wheel that can be used to provide a vehicle capable of climbing stairs and climbing over other obstacles, and also provides a paddle wheel for use on amphibious vehicles. The operation of the wheel is simple and can be made economically and light weight. It is contemplated for example that the folding wheel 101 can be made of a plastic sheet having one thickness, with pivot axes PA, PB provided by a seam of thinner plastic that will allow the sheet to bend along the seam. Heavy-duty folding wheels 101 could also be made from metal with conventional hinges.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A folding wheel having a rolling shape substantially corresponding to a circle with a wheel diameter and a center, the folding wheel comprising:
   a center wheel section encompassing the center and adapted to be mounted to an axle at the center, and having a first side substantially corresponding to a first chord of the circle and a second side opposite the first side and substantially corresponding to a second chord of the circle;
   a first wheel segment pivotally attached to the center wheel section about a first pivot axis extending along the first side of the center wheel section;
   a second wheel segment pivotally attached to the center wheel section about a second pivot axis extending along the second side of the center wheel section;
   wherein the first and second wheel segments are movable from a rolling orientation, where outer edges of the first and second wheel segments are aligned with an outer edge of the center wheel section such that the folding wheel takes the rolling shape, to a folded orientation where the first and second wheel segments extend laterally away from the respective first and second pivot axes.

2. The folding wheel of claim 1 wherein the first and second wheel segments extend laterally away from the respective first and second pivot axes in the same direction.

3. The folding wheel of claim 1 wherein the first and second wheel segments extend laterally away from the respective first and second pivot axes in opposite directions.

4. The folding wheel of claim 1 wherein the first and second chords are substantially parallel and substantially the same length.

5. The folding wheel of claim 1 comprising at least one gripping lug extending from an end of one of the first and second sides of the center wheel section when the first and second wheel segments are in the folded orientation.

6. The folding wheel of claim 5 comprising a gripping lug extending from each end of each side of the center wheel section when the first and second wheel segments are in the folded orientation.

7. A robot apparatus, the robot apparatus comprising:
   a robot body, and an axle mounted to the robot body;
   right and left folding wheels according to claim 1, the center wheel sections thereof attached to corresponding right and left outer ends of the axle;
   a control mechanism operative to move the first and second wheel segments of the right and left folding wheels between the rolling orientation and the folded orientation; and
   a drive operative to rotate the right and left folding wheels.

8. The robot apparatus of claim 7 wherein the control mechanism for at least the right folding wheel comprises a right linkage mounted to the center wheel section of the right folding wheel, the linkage connected to the first and second wheel segments of the right folding wheel, and a push member connected at an outer end thereof to the linkage and extending through the axle.

9. The robot apparatus of claim 8 wherein an inner end of the push member is connected to an actuator operative to move the push member in and out along the axle.

10. The robot apparatus of claim 8 comprising a tail section attached to the robot body and configured to rest on a surface behind the robot body when the robot apparatus travels along the surface in a forward operating travel direction, and wherein when the wheels are in the folded orientation the tail section can be moved to a substantially vertical orientation.

11. The robot apparatus of claim 10 wherein an extendable arm is attached at a lower end thereof to a rear portion of the tail section about an arm axis, and an arm drive is operative to rotate the extendable arm about the arm axis, and wherein when the wheels are in the folded orientation the tail section and extendable arm can be moved to an aligned substantially vertical orientation.

12. The robot apparatus of claim 7 wherein the robot body is configured to float on water, and wherein when the wheels are in the folded orientation, rotating the wheels propels the robot body.

13. The robot apparatus of claim 12 wherein the first and second wheel segments of at least the right folding wheel extend laterally away from the respective first and second pivot axes in opposite directions.

14. The robot apparatus of claim 13 wherein the first and second wheel segments of the left folding wheel extend laterally away from the respective first and second pivot axes in opposite directions.

15. The robot apparatus of claim 12 wherein the axle is above the water when the robot body is floating.

16. A folding wheel having a rolling shape substantially corresponding to a circle with a wheel diameter and a center, the folding wheel comprising:
　a center wheel section encompassing the center and adapted to be mounted to an axle at the center, and having a side substantially corresponding to a chord of the circle;
　a wheel segment pivotally attached to the center wheel section about a pivot axis extending along the side of the center wheel section;
　wherein the wheel segment is movable from a rolling orientation, where an outer edge of the wheel segment is aligned with an outer edge of the center wheel section such that the folding wheel takes the rolling shape, to a folded orientation where the wheel segment extends laterally away from the pivot axis.

17. The folding wheel of claim 16 wherein the center wheel section has a first side that substantially corresponds to a first chord of the circle and second side opposite the first side that substantially corresponds to a second chord of the circle, and comprising first and second wheel segments pivotally attached to the center wheel section about respective first and second pivot axes extending along the corresponding first and second sides of the center wheel section; and
　wherein the wheel segments are movable from a rolling orientation, where outer edges of the wheel segments are aligned with the outer edge of the center wheel section such that the folding wheel takes the rolling shape, to a folded orientation where the wheel segments extend laterally away from the pivot axes.

18. The folding wheel of claim 16 wherein the center wheel section has a first side that substantially corresponds to a first chord of the circle, a, second side that substantially corresponds to a second chord of the circle, and a third side that substantially corresponds to a third chord of the circle, and comprising first, second, and third wheel segments pivotally attached to the center wheel section about respective first, second, and third pivot axes extending along the corresponding first, second, and third sides of the center wheel section; and
　wherein the wheel segments are movable from a rolling orientation, where outer edges of the wheel segments are aligned with the outer edge of the center wheel section such that the folding wheel takes the rolling shape, to a folded orientation where the wheel segments extend laterally away from the pivot axes.

19. The folding wheel of claim 16 comprising at least one gripping lug extending from an end of the side of the center wheel section when the wheel segment is in the folded orientation.

20. A robot apparatus comprising:
　a robot body, and an axle mounted to the robot body;
　right and left folding wheels according to claim 16, the center wheel sections thereof attached to corresponding right and left outer ends of the axle;
　a control mechanism operative to move the wheel segments of the right and left folding wheels between the rolling orientation and the folded orientation; and
　a drive operative to rotate the right and left folding wheels.

* * * * *